US012792380B2

(12) United States Patent
Nomura et al.

(10) Patent No.: US 12,792,380 B2
(45) Date of Patent: Nov. 10, 2026

(54) DEPLOYMENT PLAN CALCULATION DEVICE, COMPUTER SYSTEM, AND DEPLOYMENT PLAN CALCULATION METHOD

(71) Applicant: Hitachi, Ltd., Tokyo (JP)

(72) Inventors: Shimpei Nomura, Tokyo (JP); Mitsuo Hayasaka, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 557 days.

(21) Appl. No.: 18/461,879

(22) Filed: Sep. 6, 2023

(65) Prior Publication Data

US 2024/0330035 A1 Oct. 3, 2024

(30) Foreign Application Priority Data

Mar. 29, 2023 (JP) ................................ 2023-052785

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC .................................................. G06F 9/45558
USPC ............................................................. 718/1
See application file for complete search history.

(56) References Cited

U.S. PATENT DOCUMENTS

2013/0138806 A1* 5/2013 Gohad .................. G06F 9/5072 709/224
2014/0380307 A1 12/2014 Zhu et al.
2016/0283275 A1* 9/2016 Li ......................... G06F 9/5011
2022/0413814 A1* 12/2022 Mukherjee ................ G06F 8/34

* cited by examiner

*Primary Examiner* — Charlie Sun
(74) *Attorney, Agent, or Firm* — Volpe Koenig

(57) ABSTRACT

A deployment optimization program causes each of a plurality of optimization engines that use different policies for calculating a deployment plan for data and containers to calculate candidate information including a candidate deployment plan that is a candidate for the deployment plan, and an evaluation value obtained by evaluating a process related to the data in the candidate deployment plan, and integrates a plurality of pieces of the candidate information based on the candidate deployment plan included in the calculated plurality of pieces of the candidate information so as to generate data and container deployment plan information.

19 Claims, 19 Drawing Sheets

FIG. 3

| INFRA-STRUCTURE ID (601) | DATA STORE ID (602) | DATA ID (603) | TYPE (604) | SNAPSHOT DATE AND TIME (605) | PATH (606) | SIZE (607) | REPLICA SOURCE SITE (608) | DOMESTIC MOVEMENT PERMITTED / PROHIBITED (609) | OVERSEAS MOVEMENT PERMITTED / PROHIBITED (610) |
|---|---|---|---|---|---|---|---|---|---|
| STORAGE CLUSTER 11 | DATA STORE A | AAAA | Original | – | /Dir1/File1 | xx | – | PERMITTED | PERMITTED |
| | | AAAA | Snapshot | XXXX/XX/XX XX:XX | /SnapshotX/Dir1/File1 | xx | – | PERMITTED | PERMITTED |
| | | BBBB | Original | – | /Dir2/File2 | xx | – | PERMITTED | PERMITTED |
| | | CCCC | Replica | XXXX/XX/XX XX:XX | /ReplicaY/Dir3/File3 | xx | SITE 2 | PERMITTED | PROHIBITED |
| | | ... | | | | | | | |
| | DATA STORE B | IIII | Original | – | /bucket1/obj1 | xx | – | PERMITTED | PROHIBITED |
| | | ... | | | | | | | |
| | | | | | | | | | |
| STORAGE APPLIANCE 11 | DATA STORE C | XXXX | Original | – | Vol001 | xx | – | PERMITTED | PROHIBITED |
| | | XXXX | Snapshot | XXXX/XX/XX XX:XX | Vol001_snapshotXXXX | xx | – | PERMITTED | PROHIBITED |
| | | ... | | | | | | | |
| | | | | | | | | | |

600 METADATA DB

FIG. 4

| SITE ID (701) | COUN-TRY (702) | INFRA-STRUCTURE (703) | TOTAL NUMBER OF CORES (704) | TOTAL CAPACITY [GB] (705) | CPU USAGE RATE (706) | MEMORY USAGE RATE (707) | NUMBER OF NODE CORES (708) | NODE CAPACITY [GB] (709) | NODE COST [$/NODE] (710) | DATA TRANSFER COST (In/Out) [$/GB] (711) | AVAIL-ABILITY [%] (712) | RENEWABLE ENERGY RATE IN ELECTRIC POWER [%] (713) | POWER USAGE AMOUNT [kWh] (714) | POWER COST [$/kWh] (715) |
|---|---|---|---|---|---|---|---|---|---|---|---|---|---|---|
| SITE 1 | JP | COMPUTER CLUSTER 11 | xx | xx | xx | xx | xx | xx | xx | xx/xx | xx | – | – | xx |
| | … | | | | | | | | | | | | | |
| | JP | STORAGE CLUSTER 11 | xx | xx | xx | xx | xx | xx | xx | xx/xx | xx | | | |
| | … | | | | | | | | | | | | | |
| | JP | STORAGE APPLIANCE 11 | xx | xx | xx | xx | xx | xx | xx | xx/xx | xx | | | |
| | … | | | | | | | | | | | | | |
| SITE 2 | JP | COMPUTER CLUSTER 21 | xx | xx | xx | xx | xx | xx | xx | xx/xx | xx | – | – | xx |
| | … | | | | | | | | | | | | | |
| … | | | | | | | | | | | | | | |

700 RESOURCE MANAGEMENT TABLE

FIG. 5

NETWORK BAND MANAGEMENT TABLE 810

812

811

| NETWORK BANDWIDTH [MB/s] | | TRANSFER DESTINATION SITE | | |
|---|---|---|---|---|
| | | SITE 1 | SITE 2 | SITE 3 |
| TRANSFER SOURCE SITE | SITE 1 | – | 100 | 200 |
| | SITE 2 | 100 | – | 50 |
| | SITE 3 | 200 | 50 | – |

NETWORK LATENCY MANAGEMENT TABLE 820

812

811

| NETWORK LATENCY [ms] | | TRANSFER DESTINATION SITE | | |
|---|---|---|---|---|
| | | SITE 1 | SITE 2 | SITE 3 |
| TRANSFER SOURCE SITE | SITE 1 | – | 20 | 40 |
| | SITE 2 | 20 | – | 10 |
| | SITE 3 | 40 | 10 | – |

NETWORK TRANSFER CHARGE MANAGEMENT TABLE 830

812

811

| TRANSFER AMOUNT CHARGE [$/GB] | | TRANSFER DESTINATION SITE | | |
|---|---|---|---|---|
| | | SITE 1 | SITE 2 | SITE 3 |
| TRANSFER SOURCE SITE | SITE 1 | – | xx | xx |
| | SITE 2 | xx | – | xx |
| | SITE 3 | xx | xx | – |

800 INTER-SITE NETWORK MANAGEMENT TABLE

FIG. 6

901 902 903

| APPLICATION ID | EXPLANATORY INFORMATION | NON-EXECUTABLE SITE |
|---|---|---|
| APPLICATION A | IMAGE ANALYSIS | – |
| APPLICATION B | SPEECH ANALYSIS | – |
| APPLICATION C | NATURAL LANGUAGE PROCESSING | SITE 1, SITE 2 |
| ... | | |

900 APPLICATION MANAGEMENT TABLE

FIG. 7

1001 1002

| DATA STORE ID | TYPE |
|---|---|
| DATA STORE A | File |
| DATA STORE B | Object |
| DATA STORE C | Block |
| DATA STORE D | Database |

1000 DATA STORE MANAGEMENT TABLE

FIG. 8

| 1201 | 1202 | | | | | 1203 | | | | 1204 |
|---|---|---|---|---|---|---|---|---|---|---|
| OPTIMIZATION ENGINE ID | APPLICATION PERFORMANCE | EXECUTION COST | AVAIL-ABILITY | RENEWABLE ENERGY RATE | … | SECONDARY USE | CLOUD MIGRATION | DR | … | PATH |
| OPTIMIZATION ENGINE A | ○ | × | × | × | | ○ | ○ | × | | /aa/aa/aa |
| OPTIMIZATION ENGINE B | × | × | ○ | ○ | | ○ | ○ | × | | /bb/bb/bb |
| … | | | | | | | | | | |

FIG. 11

| 651 DATA ID | 652 SNAPSHOT DATE AND TIME | 653 SIZE | 654 DOMESTIC MOVEMENT PERMITTED / PROHIBITED | 655 OVERSEAS MOVEMENT PERMITTED / PROHIBITED | 656 SITE ID | 657 DATA STORE ID | 658 INFRA-STRUCTURE ID | 659 TYPE | 660 PATH |
|---|---|---|---|---|---|---|---|---|---|
| AAAA | – | xx | PERMITTED | PERMITTED | SITE 1 | DATA STORE A | STORAGE CLUSTER 11 | Original | /Dir1/File1 |
| | XXXX/XX/XX XX:XX | xx | PERMITTED | PERMITTED | SITE 1 | DATA STORE A | STORAGE CLUSTER 11 | Snapshot | /SnapshotX/Dir1/File1 |
| | | | | | SITE 2 | DATA STORE A | STORAGE CLUSTER 21 | Replica | /ReplicatX/Dir1/File1 |
| ... | | | | | | | | | |

650 METADATA SEARCH RESULT BETWEEN DISTRIBUTED SITES

1900 CONTAINER AND DATA DEPLOYMENT PLAN CALCULATION REQUEST SCREEN

FIG. 15

2011, 2012, 2013

| CONTAINER ID | DEPLOYMENT SITE | DEPLOYMENT INFRASTRUCTURE |
|---|---|---|
| CONTAINER A | SITE 1 | COMPUTER CLUSTER 11 |

2010 CONTAINER DEPLOYMENT PLAN 2021, 2022

| CPU | MEMORY | ... |
|---|---|---|
| 2.0 CORE | 2.0GB | |

2020 CONTAINER ALLOCATION RESOURCE PLAN 2031, 2032, 2033, 2034

| DATA ID | DEPLOYMENT SITE | DEPLOYMENT INFRASTRUCTURE | DEPLOYMENT DATA STORE |
|---|---|---|---|
| DATA XXXX | SITE 1 | STORAGE APPLIANCE 11 | DATA STORE C |

2030 DATA DEPLOYMENT PLAN 2041, 2042

| CPU 2041 | MEMORY 2042 | ... |
|---|---|---|
| 2.0 CORE | 2.0GB | |

2040 DATA STORE ALLOCATION RESOURCE PLAN 2051, 2052, 2053, 2054, 2055, 2056, 2057, 2058

| EXECUTION TIME | EXECUTION COST | AVAIL-ABILITY | RENEWABLE ENERGY RATE | POWER CONSUMP-TION | $CO_2$ EMISSIONS | DATA TRANSFER TIME | DATA TRANSFER COST | ... |
|---|---|---|---|---|---|---|---|---|
| xx min | – | – | – | – | – | – | – | |

2050 EXECUTION INFORMATION ESTIMATION

2000 CANDIDATE INFORMATION

DEPLOYMENT PLAN CALCULATION DEVICE, COMPUTER SYSTEM, AND DEPLOYMENT PLAN CALCULATION METHOD

BACKGROUND OF THE INVENTION

1. Field of the Invention

The present disclosure relates to a deployment plan calculation device, a computer system, and a deployment plan calculation method.

2. Description of Related Art

In hybrid cloud systems, multi-cloud systems, and the like, data stored in a plurality of sites are used for various purposes. In order to improve the efficiency of data utilization, it is necessary to determine the sites where application programs for using data are deployed, the allocation resource amount to be allocated to the application programs, and the like, in consideration of the performance and cost of each site (see US2014/0380307A). In addition, in recent years, there is a high demand for the use of renewable energy for the realization of a decarbonized society, etc., and it is also required to consider the utilization rate of renewable energy and the like.

Creating a single optimization engine applied to various requests of users as an optimization engine that determines a deployment plan including an application program deployment destination, an allocation resource amount, and the like, has a problem of increased man-hours. Further, simply combining and using multiple optimization engines applied to a single request will only result in calculation of multiple optimum plans in consideration of the single request, and it is thus difficult to create a deployment plan in consideration of multiple requests.

SUMMARY OF THE INVENTION

An object of the present disclosure is to provide a deployment plan calculation device, a computer system, and a deployment plan calculation method, which are capable of easily creating a deployment plan in consideration of various requests of users.

A deployment plan calculation device according to an aspect of the present disclosure is a deployment plan calculation device that generates deployment plan information on a deployment plan for deploying data and a processing component for performing a process related to the data to one of a plurality of site systems having computers, in which, in the deployment plan, the data and the processing component, and the site systems where the data and the processing component are deployed are associated with each other, and the deployment plan calculation device includes a memory, a processor, and a plurality of calculation engines executed by the processor, in which the memory stores management information on each of the plurality of site systems, the plurality of calculation engines calculate candidate information including a candidate deployment plan that is a candidate for the deployment plan, and an evaluation value obtained by evaluating a process related to the data in the candidate deployment plan based on the management information and a target performance that is a target performance of the process, each of the plurality of calculation engines has a plurality of policies defining calculation methods for calculating the candidate information, and calculates candidate information using one or more of the plurality of policies, respectively, and the processor causes each of the plurality of calculation engines that use different policies for calculating the deployment plan to calculate the candidate information, and integrates a plurality of pieces of the candidate information based on the candidate deployment plan included in the calculated plurality of pieces of the candidate information so as to generate the deployment plan information.

According to the present disclosure, it is possible to easily create a deployment plan in consideration of various requests of users.

BRIEF DESCRIPTION OF THE DRAWINGS

FIG. 3 is a diagram showing an example of a metadata DB;

FIG. 4 is a diagram showing an example of a resource management table;

FIG. 5 is a diagram showing an example of an inter-site network management table;

FIG. 6 is a diagram showing an example of an application management table;

FIG. 7 is a diagram showing an example of a data store management table;

FIG. 8 is a diagram showing an example of an optimization engine management table;

FIG. 11 is a diagram showing an example of a metadata search result between distributed sites;

FIG. 15 is a diagram showing an example of candidate information;

DESCRIPTION OF EMBODIMENTS

Hereinafter, embodiments of the present disclosure will be described below with reference to the drawings. It is to be noted that the embodiments described below are not intended to limit the disclosure of the claims, and that not all of the elements and combinations thereof described in the embodiments are essential to the solution of the present disclosure.

While the "program" may be described as a subject that performs a process in the following description, because the program is executed by a processor (e.g., central processing unit (CPU)) to perform a predetermined process by appropriately utilizing storage resources (e.g., memories) and/or communication interface devices (e.g., network interface cards (NICs)), it can be said that the processor or a computer having the processor is the subject that performs the process.

Figure 1:
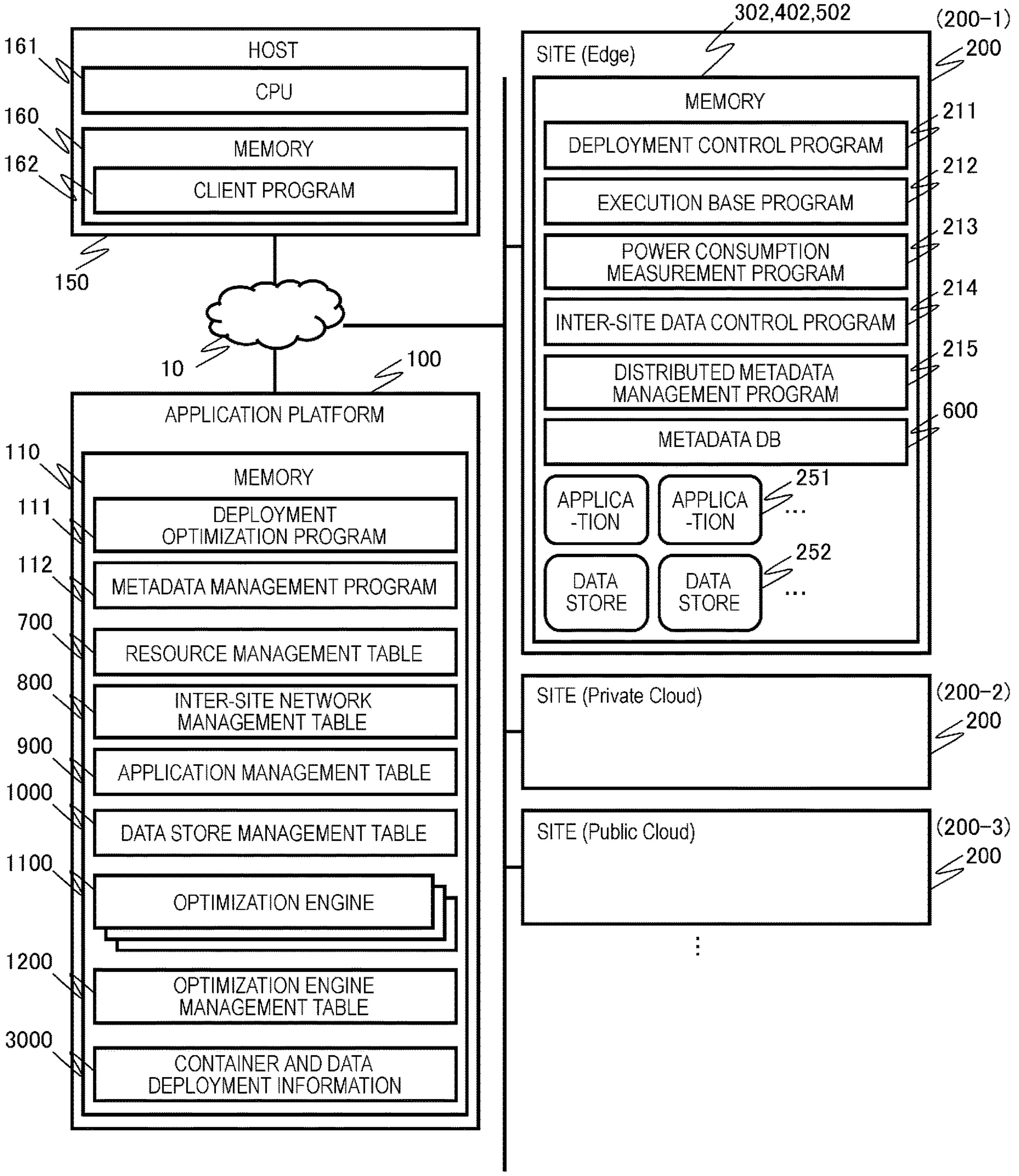
FIG. 1 is a diagram showing an overall configuration of a computer system according to an embodiment of the present disclosure.

FIG. 1 is a diagram showing an overall configuration of a computer system according to an embodiment of the present disclosure. The computer system shown in FIG. 1 includes an application platform 100, a host 150, and a plurality of sites 200 (site systems). The application platform 100, the host 150, and each site 200 are communicatively connected to each other via a network 10.

The application platform 100 is a deployment plan calculation device that generates deployment plan information on a deployment plan for deploying data and a processing component for performing a process related to the data to one of the sites 200. In the deployment plan, the data and the processing component are associated with the sites 200 where the data and the processing component are deployed. The processing component is a container in the present embodiment, but may be a virtual machine (VM), a process, or the like. In addition, the deployment plan may be created for an execution processor, that is, a processor that executes a program, as the processing component. The program that performs the process related to the data includes a first program and a second program in the present embodiment, in which the first program is a data store program (hereinafter, simply referred to as a "data store") that manages data, and the second program is an application program (hereinafter, simply referred to as an "application") that accesses the data store and executes a predetermined process. It is to be noted that the first and second programs are not limited to the above example, and may be applications or the like that perform different processes from each other. For example, the first program may be an application that performs machine learning inference, and the second program may be an application that uses the inference results of the first program to recommend products, services, or the like.

The host 150 is used by a user of the computer system. The host 150 includes a memory 160 and a CPU 161. The memory 160 stores a client program 162. The CPU 161 reads the client program 162 stored in the memory 160 and executes the read client program 162 to perform a client process. For example, the client process includes a process of transmitting a calculation request for a container and data deployment plan, that is, for a deployment plan for the container and data, and a deployment request based on the container and data deployment plan to the application platform 100.

The site 200 is a site system, that is, a computer system for storing data, constructing containers, and executing the process related to the data. For example, each site 200 is installed at a geographically separated location. Further, each site 200 may be installed across countries. In FIG. 1, three sites 200-1 to 200-3 are shown as examples of the site 200, but there may be provided a plurality of sites 200. It is to be noted that the site 200-1 is an edge, the site 200-2 is a private cloud, and the site 200-3 is a public cloud, but this is merely an example, and the type of each site 200 is not limited to this example.

Figure 2:
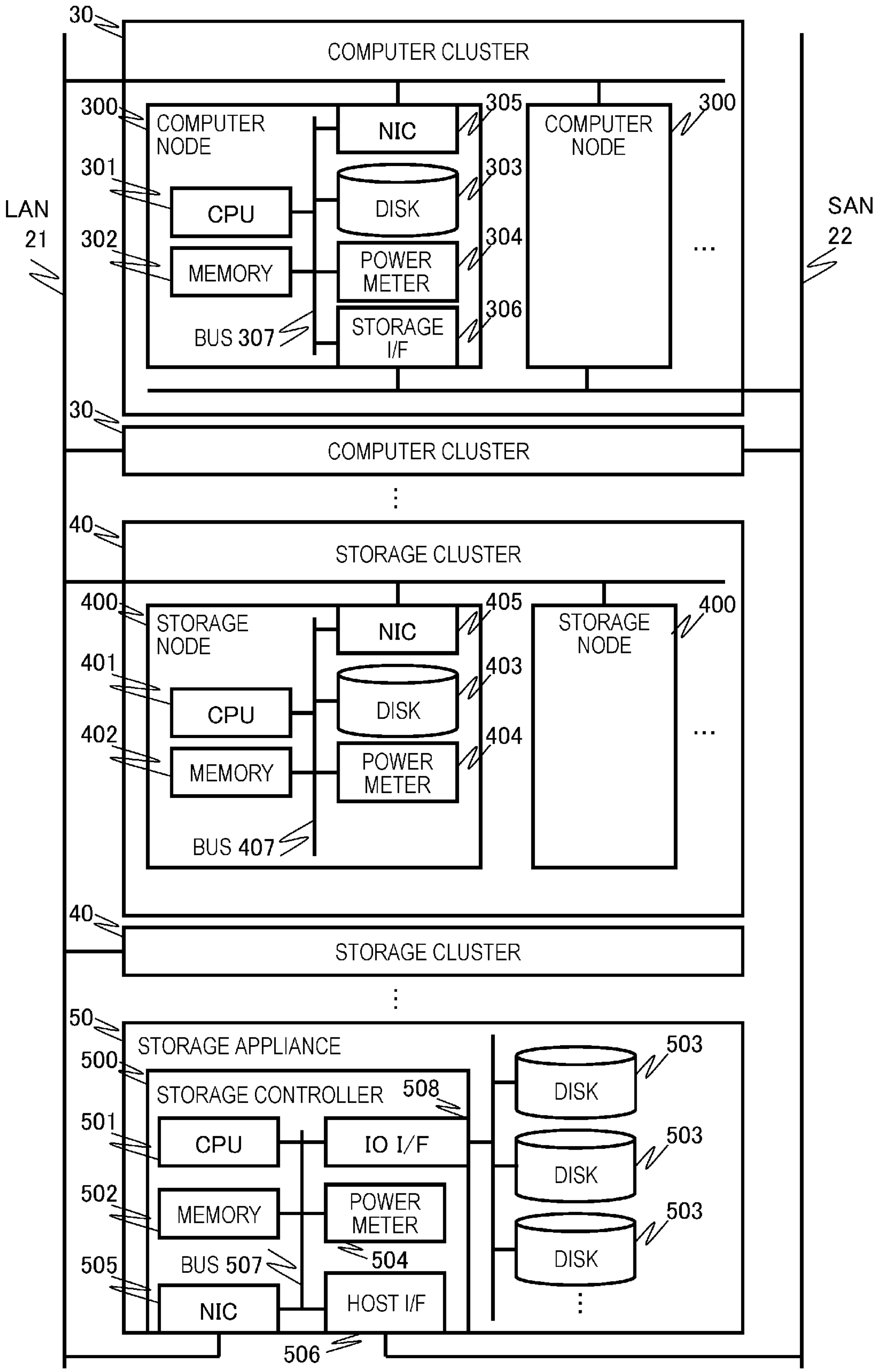
FIG. 2 is a diagram showing an example of a hardware configuration of each site.

FIG. 2 is a diagram showing an example of a hardware configuration of each site 200. As shown in FIG. 2, the site 200 includes, as an infrastructure, that is, as equipment for storing data and executing a predetermined process, one or more computer clusters 30, one or more storage clusters 40, and one or more storage appliances 50. The computer clusters 30, the storage clusters 40, and the storage appliances 50 are communicatively connected to each other via a local area network (LAN) 21 and a storage area network (SAN) 22.

The computer cluster 30 is a collection of computer nodes 300 and includes one or more computer nodes 300.

The computer node 300 is a computer node that executes applications and performs a predetermined process. The computer node 300 is implemented by a general-purpose computer system in the present embodiment, but may be implemented by a dedicated device. The computer node 300 includes a CPU 301, a memory 302, a disk 303, a power meter 304, a network interface card (NIC) 305, and a storage I/F 306, which are communicatively connected to each other via a bus 307. The CPU 301 reads a program recorded in the memory 302 and executes the read program to perform various processes. The memory 302 stores a program that defines the operation of the CPU 301, various kinds of information that is used or generated by the program, and the like. The disk 303 is a secondary storage device. The power meter 304 measures an amount of power consumption of a corresponding node. The NIC 305 is an interface for communicating with other devices via the LAN 21. The storage I/F 306 is an interface for communicating with the storage appliance 50 via the SAN 22.

The storage cluster 40 is a collection of storage nodes 400 and includes one or more storage nodes 400.

The storage node 400 is a computer node that executes a data store program (hereinafter, simply referred to as a "data store") to manage the data. The storage node 400 is implemented by a general-purpose computer system in the present embodiment, but may be implemented by a dedicated device. The storage node 400 includes a CPU 401, a memory 402, a disk 403, a power meter 404, and an NIC 405, which are communicatively connected to each other via a bus 407. The CPU 401 reads a program recorded in the memory 402 and executes the read program to perform various processes. The memory 402 stores a program that defines the operation of the CPU 401, various kinds of information that is used or generated by the program, and the like. The disk 403 is a secondary storage device. The power meter 404 measures an amount of power consumption of a corresponding node. The NIC 405 is an interface for communicating with other devices via the LAN 21.

The storage appliance 50 is a computer node (storage device) that includes a plurality of disks 503 that store data and a storage controller 500 that reads and writes data to and from the disks 503. The storage appliance 50 may be a block storage, a file storage, an object storage, or a combination thereof. The storage controller 500 includes a CPU 501, a memory 502, a power meter 504, an NIC 505, a host I/F 506, and an IO I/F 508, which are communicatively connected to each other via a bus 507. The CPU 501 reads a program stored in the memory 502 and executes the read program to perform various processes. The memory 502 stores a program that defines the operation of the CPU 501, various kinds of information that is used or generated by the program, and the like. The power meter 504 measures an amount of power consumption of a corresponding node. The NIC 405 is an interface for communicating with other devices via the LAN 21. The host I/F 506 is an interface for communicating with the computer cluster 30 via the SAN 22. The IO I/F 508 is an interface for communicating with the disks 503.

It is to be noted that the computer cluster 30 and the storage cluster 40 may not be distinct from each other, and the same cluster may execute both the application and the data store.

The memories 302, 402, and 502 of the computer node 300, the storage node 400, and the storage appliance 50 store a deployment control program 211, an execution base program 212, and a power consumption measurement program 213, as shown in FIG. 1. In addition, the memory 302 of the computer node 300 further stores a plurality of applications (applications) 251 as well as the programs (211 to 213), the memories 402 and 502 of the storage node 400 and the storage appliance 50 store an inter-site data control program 214 and a metadata management program 215 as well as the programs (211 to 213), and the memory 502 further stores a plurality of data stores 252. For each site, a metadata DB 600 is stored in one of the memories of that site. It is to be noted that FIG. 1 shows each program and information without distinguishing between the memories 302, 402, and 502.

The deployment control program 211 deploys the application 251 and the data store 252 on the container according to the deployment request based on the container and data deployment plan. The execution base program 212 constructs the container of the application 251 and the data store 252 according to the deployment request. In addition, the execution base program 212 allocates hardware resources (HW resources) to the application 251 and the data store 252, acquires hardware metrics and execution logs, and the like, according to the deployment request.

The power consumption measurement program 213 uses the power meters 304, 404, or 504 to measure an amount of power consumption of a corresponding node. The inter-site data control program 214 moves (migrates) data between the sites 200 according to a data migration request based on the container and data deployment plan. The metadata management program 215 provides an inter-site search function of the metadata DB 600 to search for data between sites.

The metadata DB 600 is a collection of metadata related to the data stored on the disks 403 and 503 of the storage cluster 40 and the storage appliance 50.

FIG. 3 is a diagram showing an example of the metadata DB 600. In the present embodiment, the metadata DB 600 is stored for each site 200 as described above, but is not limited to this example and may be stored for each infrastructure, for example. In addition, FIG. 3 shows an example of the metadata DB 600 at the site 200-1.

The metadata DB 600 shown in FIG. 3 includes fields 601 to 610. The field 601 stores an infrastructure ID, that is, identification information for identifying an infrastructure. The infrastructure includes the storage cluster 40 and the storage appliances 50. The field 602 stores a data store ID, that is, identification information for identifying a data store that manages the data. The field 603 stores a data ID, that is, identification information for identifying the data. The field 604 stores the type of the data. In the present embodiment, the type of the data includes "Original" indicating original data, "Snapshot" indicating a snapshot of the original data in the same site, or "Replica" indicating replicated data, that is, a snapshot of the original data at another site. When the type of the data is "Snapshot" or "Replica", the field 605 stores snapshot date and time which is date and time when the snapshot is acquired.

The field 606 stores path information, that is, storage destination information indicating a storage destination where the data is stored. However, the storage destination information is not limited to the path information, and may vary depending on the type of the storage destination. For example, the storage destination information may be a volume identifier when the storage destination is a block storage, a uniform resource identifier (URI) when the storage destination is object storage, or the like. The storage destination may be a uniform resource name (URN) of a database, a table name, or the like. The field 607 stores a size of the data. When the type of the data is "Replica", the field 608 stores a site ID, that is, identification information for identifying the site that is the replica source of the data (replicated data). The fields 609 and 610 store constraint information regarding data movement. Specifically, the field 609 stores domestic movement permission or prohibition information indicating whether data movement to another site inside the country is permitted, and the field 610 stores overseas movement permission or prohibition information indicating whether data movement to another site outside the country is permitted. The domestic movement permission or prohibition information and the overseas movement permission or prohibition information indicate "permitted" when the movement is permitted, and indicate "prohibited" when the movement is not permitted.

In addition to the fields 601 to 610, the metadata DB 600 may include a field for storing other information, for example, a field for storing labels indicating the content of data as information to be used for searching the metadata.

The description will continue by referring back to FIG. 1. The application platform 100 includes a memory 110 that stores various kinds of programs and information, and a CPU 120 that is a processor that reads the programs stored in the memory 110 and executes the read programs to implement various functions.

In the present embodiment, the memory 110 stores a deployment optimization program 111, a metadata management program 112, a resource management table 700, an inter-site network management table 800, an application management table 900, a data store management table 1000, a plurality of optimization engines 1100, an optimization engine management table 1200, and container and data deployment information 3000.

The deployment optimization program 111 is a program for generating, by using the optimization engine 1100, the container and data deployment information 3000 which is the deployment plan information on the container and data deployment plan. In addition, the deployment optimization program 111 may also present the container and data deployment information 3000 to the user via the host 150, and transmit deployment requests and data migration requests based on the container and data deployment information 3000 to each site 200 so as to deploy the data and the containers according to the container and data deployment information 3000.

The metadata management program 112 is a program for managing metadata related to the data distributed and managed at each site 200. The resource management table 700, the inter-site network management table 800, the application management table 900, and the data store management table 1000 are management information on each site 200.

The optimization engine 1100 is a calculation engine that calculates candidate information including candidate deployment plans, which are candidates for container and data deployment plans, based on the management information and the metadata managed by a distributed metadata management process 113. The candidate information is information that is used for generating the container and data deployment information 3000 in the deployment optimization program 111, and specifically, includes the candidate deployment plan and an evaluation value obtained by evaluating the performance related to processes of an application 151 and a data store 152 according to the candidate deployment plan. The type of the evaluation value varies depending on an optimization policy, which will be described below. It is to be noted that the optimization engine 1100 is constructed based on techniques such as mathematical optimization or machine learning, for example. The optimization engine management table 1200 is information for managing the optimization engine 1100.

FIG. 4 is a diagram showing an example of the resource management table 700. The resource management table 700 is information for managing the HW resource information on the hardware resources of each site 200 and power resource information on the power situation at each site 200, and includes fields 701 to 715.

The field 701 stores a site ID, that is, identification information for identifying the site 200. The field 702 stores a country code indicating the country in which the site 200 is located.

The fields 703 to 711 store the HW resource information. Specifically, the field 703 stores an infrastructure ID identifying an infrastructure installed at the site 200. The fields 704 to 709 store information indicating the HW resources of the infrastructure. Specifically, the field 704 stores a total number of cores, that is, the sum of CPU cores of the computer nodes in the infrastructure. The field 705 stores a total capacity, that is, the sum of the memory capacities of the computer nodes in the infrastructure. The field 706 stores a usage rate of the CPUs of the computer nodes in the infrastructure. The field 706 stores a memory usage rate of the computer nodes in the infrastructure. The field 708 stores the number of node cores, that is, the number of cores per computer node in the infrastructure. The field 709 stores a node memory capacity, that is, a memory capacity per computer node in the infrastructure. In the present embodiment, the number of CPU cores and the memory capacity are the same for each computer node.

The field 710 stores a node cost, that is, the cost borne by the user per one computer node. In addition, the node cost is provided to the user for each computer node. The field 711 stores a data transfer cost, that is, the cost for data transfer in the site 200. The field 712 stores, as availability, a ratio of time that the infrastructure can actually operate continuously relative to the total operating time.

The fields 713 to 715 store power resource information. Specifically, the field 713 stores a renewable energy rate in electric power, that is, a ratio of an amount of available renewable energy, that is, an amount of power generated by renewable energy that can be used at the site 200, to the total amount of power that can be used at the site 200. The field 714 stores a current amount of power usage at the site 200. The field 715 stores a power cost, that is, the cost related to the use of power. It is to be noted that, when the amount of available renewable energy is determined at the site 200 instead of the renewable energy rate in electric power, the corresponding information may be held in the resource management table 700.

In addition, the power cost may be divided into a cost based on the amount of power by the renewable energy and a cost based on the amount of power by the energies other than the renewable energy. Alternatively, only one of the amount of available renewable energy and the renewable energy rate in electric power may be stored. It is to be noted that, depending on the site 200, the amount of available renewable energy may be determined, or the renewable energy rate in electric power may be determined. In addition, none of the amount of available renewable energy and the renewable energy rate in electric power may be determined.

In addition, the resource management table 700 may include power prediction information indicating a prediction value that is obtained by predicting the amount of available renewable energy or renewable energy rate in electric power in the future, instead of or in addition to the current amount of available renewable energy or renewable energy rate in electric power.

FIG. 5 is a diagram showing an example of the inter-site network management table 800. The inter-site network management table 800 is information on communication between the sites 200, and includes a network band management table 810, a network latency management table 820, and a network transfer charge management table 830.

The network bandwidth management table 810 indicates, for each combination of the sites 200 (site IDs), a network bandwidth between a transfer source site 811 which is a data transfer source and a transfer destination site 812 which is a data transfer destination.

The network latency management table 820 indicates, for each combination of the sites 200, a network latency, that is, the latency between the transfer source site 811 and the transfer destination site 812.

The network transfer charge management table 830 indicates, for each combination of the sites 200, a transfer amount charge, that is, the charge for communication between the transfer source site 811 and the transfer destination site 812.

FIG. 6 is a diagram showing an example of the application management table 900. The application management table 900 includes fields 901 to 903. The field 901 stores an application ID, that is, identification information for identifying the application 251. The field 902 stores explanatory information indicating the contents of the process performed by the application 251. The field 903 stores site IDs of non-executable sites, that is, the sites 200 at which execution of the application 251 is not permitted.

FIG. 7 is a diagram showing an example of the data store management table 1000. The data store management table 1000 is information for managing the data store 252, and includes fields 1001 and 1002. The field 1001 stores a data store ID, that is, identification information for identifying the data store 252. The field 1002 stores the type of storage corresponding to the data store 252 as a type of the data store 252.

FIG. 8 is a diagram showing an example of the optimization engine management table 1200. The optimization engine management table 1200 is information for managing the optimization engine 1100, and includes fields 1201 to 1204.

The field 1201 stores an optimization engine ID, that is, identification information for identifying the optimization engine 1100. The field 1202 stores support policy information indicating one or more optimization policies supported by the optimization engine 1100. The optimization policy is a policy that defines a calculation method (optimization method) for calculating a candidate deployment plan that is a candidate for the container and data deployment plan. In the present embodiment, the optimization policies are differentiated by performance indices to be optimized (e.g., minimized or maximized) with respect to the process by the application 151. The performance index is an index indicating the performance related to the process of the application 151, and includes, for example, an application performance (process speed, and the like), that is, the performance of the application itself, an execution cost for execution during process, availability of process, and a renewable energy rate in electric power (renewable energy rate) and power consumption related to the process. In the example of FIG. 8, the support policy information indicates "O" when the optimization policy is supported, and "X" when the optimization policy is not supported for each optimization policy.

It is to be noted that the optimization engine 1100 may support the plurality of optimization policies, or there may be the plurality of optimization engines 1100 supporting the same optimization policy.

The field 1203 stores supported use case information indicating use cases supported by the optimization engine 1100. A use case is purpose of using the site 200. In the present embodiment, the use case includes "Secondary Use" to use the data generated by the application 251 in the cloud (sites 200-2 and 200-3, etc.) at another application, "Cloud Migration" to migrate the data generated by the local (site 200-1) application 251 to the cloud, and "Disaster Recovery (DR)" to recover at another site 200 when it is difficult to use one site 200 due to disaster or the like, but the use case is not limited to the above. In the example of FIG. 8, for each use case, the supported use case information indicates "O" when the use case is supported, and "X" when the use case is not supported. The field 1204 stores path information indicating the storage location where the optimization engine 1100 is stored.

It is to be noted that the optimization engine 1100 may support the plurality of optimization policies or support a plurality of use cases. Further, there may be the plurality of optimization engines 1100 supporting the same optimization policy, and the plurality of optimization engines 1100 supporting the same use case.

Figure 9:
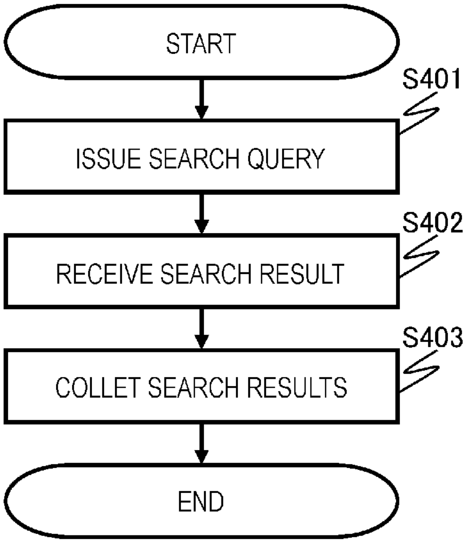
FIG. 9 is a flowchart illustrating an example of a metadata search process between distributed sites.

FIG. 9 is a flowchart illustrating an example of a metadata search process between distributed sites by the metadata management program 112 of the application platform 100. The metadata search process between distributed sites is executed when the metadata search request is received from the user via the client program 162 of the host 150, for example.

In the metadata search process between distributed sites, first, the metadata management program 112 issues a search query for the metadata DB 600 to each site 200 (step S401). Then, the metadata management program 112 receives search results corresponding to the search query from each site 200 (step S402). The metadata management program 112 creates a metadata search result between distributed sites obtained by aggregating the search results from each site 200, responds to the user via the client program 162 of the host 150 (step S403), and ends the process. In addition, the metadata search result between distributed sites may be recorded in the memory 110 of the application platform 100 or the like.

Figure 10:
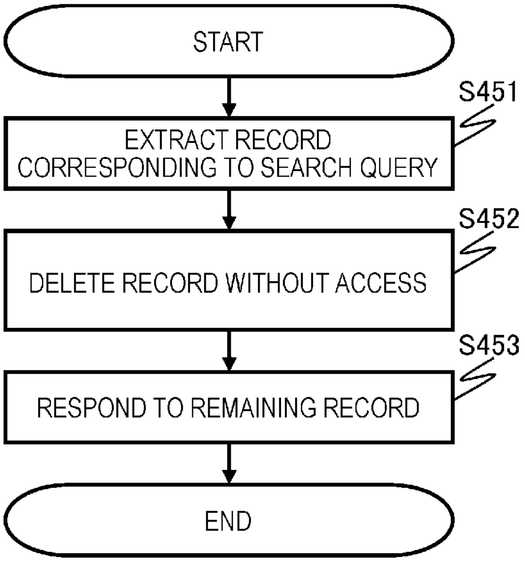
FIG. 10 is a flowchart illustrating an example of an intra-site metadata search process.

FIG. 10 is a flowchart illustrating an example of an intra-site metadata search process, that is, a process on the side that receives the search query in step S401. The intra-site metadata search process is executed when the search query is received by the metadata management program 215 of one of the computer nodes in the site 200 (computer node holding the metadata DB 600, and the like), for example.

In the intra-site metadata search process, the metadata management program 215 searches for records corresponding to the search query from the metadata DB 600 in the corresponding site (step S451). The metadata management program 215 deletes, from the searched records, records to which the user of the search source does not have an access (step S452). The metadata management program 215 creates the non-deleted remaining records as the search results of the search query, responds to the storage appliance 50 (step S453), and ends the process. In addition, accesses are managed at each site 200, for example.

FIG. 11 is a diagram showing an example of the metadata search result between distributed sites. A metadata search result 650 between distributed sites shown in FIG. 11 includes fields 651 to 660.

The field 651 stores a data ID identifying the data. The field 652 stores snapshot date and time of the data. The field 652 stores a size of the data. The field 654 stores domestic movement permission or prohibition information of the data. The field 655 stores overseas movement permission or prohibition information of the data. The field 656 stores a site ID indicating a site that stores the data. The field 657 stores a data store ID identifying a data store corresponding to the data. The field 658 stores an infrastructure ID identifying an infrastructure that executes the data store corresponding to the data. The field 659 stores the type of the data. The field 660 stores data path information.

Figure 12:
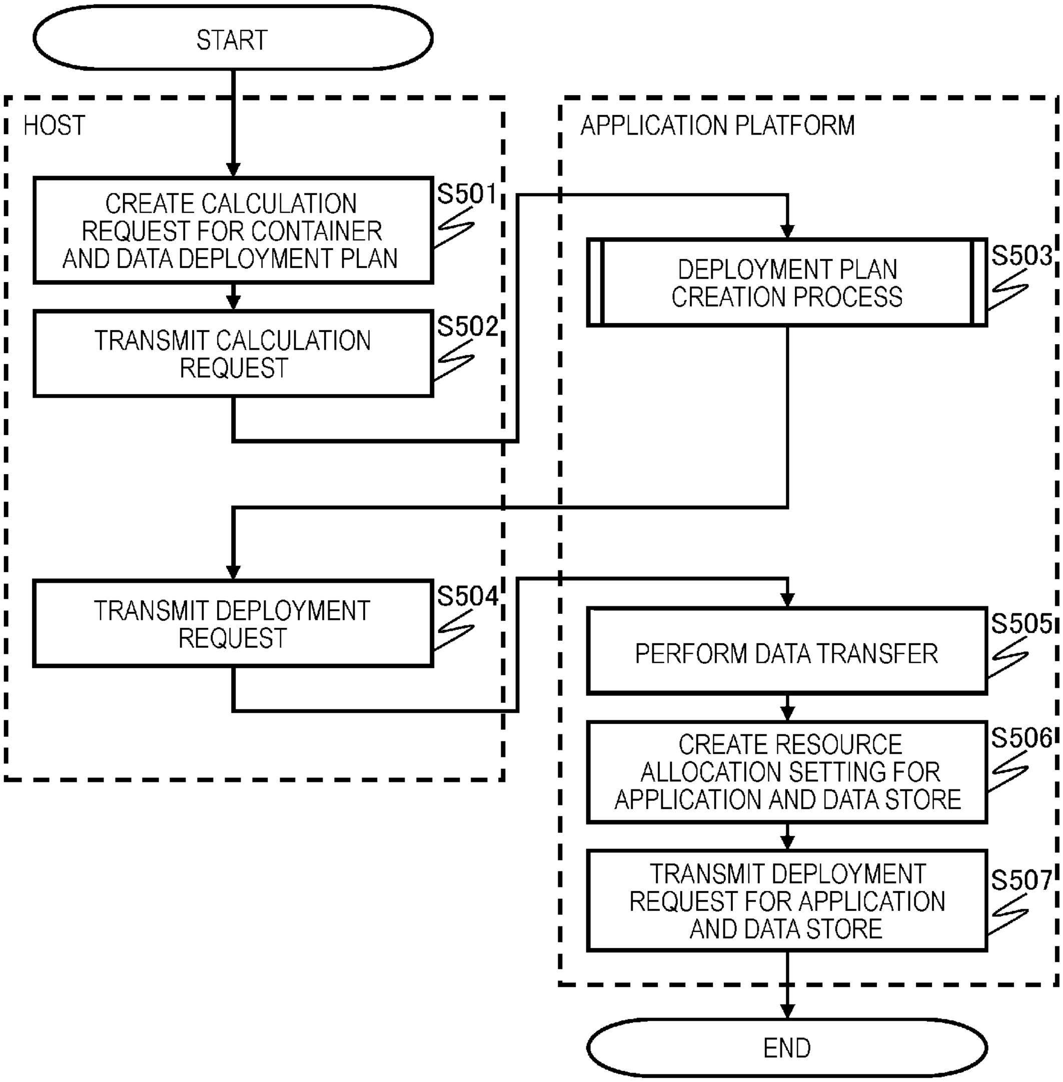
FIG. 12 is a flowchart illustrating an example of an application deployment process.

FIG. 12 is a flowchart illustrating an example of an application deployment process of deploying the application 151 and the data store 152.

In the application deployment process, first, the client program 162 of the host 150 receives deployment conditions, that is, conditions for deploying the application 151 and the data store 152 from the user, and creates the calculation request for the container and data deployment plan according to the deployment conditions (step S501). The client program 162 transmits the created calculation request to the application platform 100 (step S502).

The deployment optimization program 111 of the application platform 100 receives the calculation request, and executes a deployment plan creation process (see FIG. 14) of creating the container and data deployment information 3000 based on the calculation request, storing the information in the memory 110, and returning the information to the host 150 (step S503).

The client program 162 of the host 150 receives the container and data deployment information 3000 and displays (presents) the container and data deployment information 3000. Then, when the client program 162 receives the information indicating that the container and data deployment information 3000 is approved, the client program 162 transmits the deployment request based on the container and data deployment information 3000 to the application platform 100 (step S504). When the container and data deployment plan is not approved, the client program 162 returns to the process of step S501.

Upon receiving the deployment request, the deployment optimization program 111 of the application platform 100 transmits the data migration request based on the container and data deployment information 3000 to the data transfer source site, and transfers the data migration request to the data transfer destination site (step S505). For example, the deployment optimization program 111 transmits the data migration request to the inter-site data control program 214 of the storage node 400 executing the data store 252 corresponding to the data to be transferred at the data transfer source site 200, thereby causing the inter-site data control program 214 to execute the data transfer.

The deployment optimization program 111 creates a configuration file (e.g., a container manifest file, and the like) for an allocation resource amount of HW resources for the application 151 and the data store 152 according to the deployment request (step S506). The deployment optimization program 111 transmits the deployment request to which the configuration file is added, to a deployment site indicated by the container and data deployment plan (step S507), and ends the process.

Figure 13:
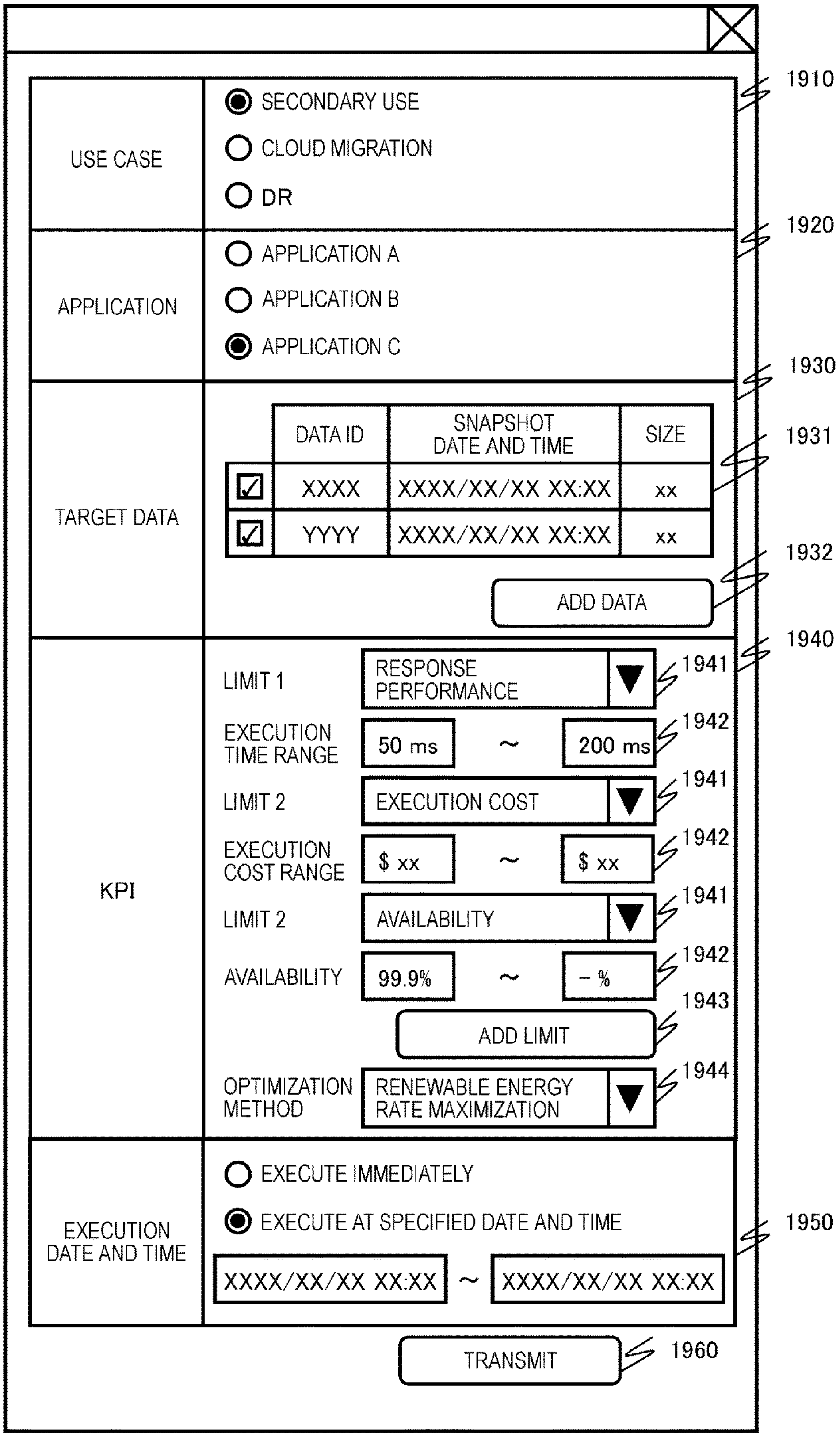
FIG. 13 is a diagram showing an example of a container and data deployment plan calculation request screen.

FIG. 13 is a diagram showing an example of a container and data deployment plan calculation request screen for the user to input the deployment conditions.

A container and data deployment plan calculation request screen 1900 shown in FIG. 13 includes a use case selection field 1910, an application selection field 1920, a data selection field 1930, a key performance indicator (KPI) input field 1940, an execution date and time input field 1950, and a transmission button 1960.

The use case selection field 1910 is an interface for designating the use case, that is, the purpose of using the site 200. The application selection field 1920 is an interface for designating the application 151 to be deployed in the container. The data selection field 1930 is an interface for designating data to be used by the target application 151, and includes a list 1931 showing a list of data to be used and an add button 1932 for adding the data to be used.

The application selection field 1920 and the data selection field 1930 may be changed depending on the use case designated in the use case selection field 1910. For example, when "cloud migration" is designated as the use case, the application selection field 1920 may be used as an interface for selecting a container in operation, and the corresponding application and data may be specified from information on the container in operation.

The KPI input field 1940 is an interface for designating the KPI, that is, the target performance of the container and data deployment plan to be created, and includes a selection field 1941 for designating the type of the KPI, an input field 1942 for designating the value of the KPI of the type selected in the selection field 1941, an add button 1943 for adding the type of the KPI to be designated, and a method selection field 1944 for designating the optimization policy. Examples of the type of the KPI include application performance, reliability, execution cost, execution power, and the like. The optimization policy indicates maximization of the renewable energy rate in electric power, maximization of the amount of available renewable energy, or minimization of power costs, for example.

The execution date and time input field 1950 is an interface for designating a deployment timing when executing the deployment, and in the illustrated example, it is possible to select the setting of the current time (immediately) or any other date and time. The transmission button 1960 is a button for transmitting the designated deployment conditions. In addition, the deployment conditions include designation information, that is, information (use case, application, data, KPI, optimization policy, and deployment timing) designated on the container and data deployment plan calculation request screen 1900.

Figure 14:
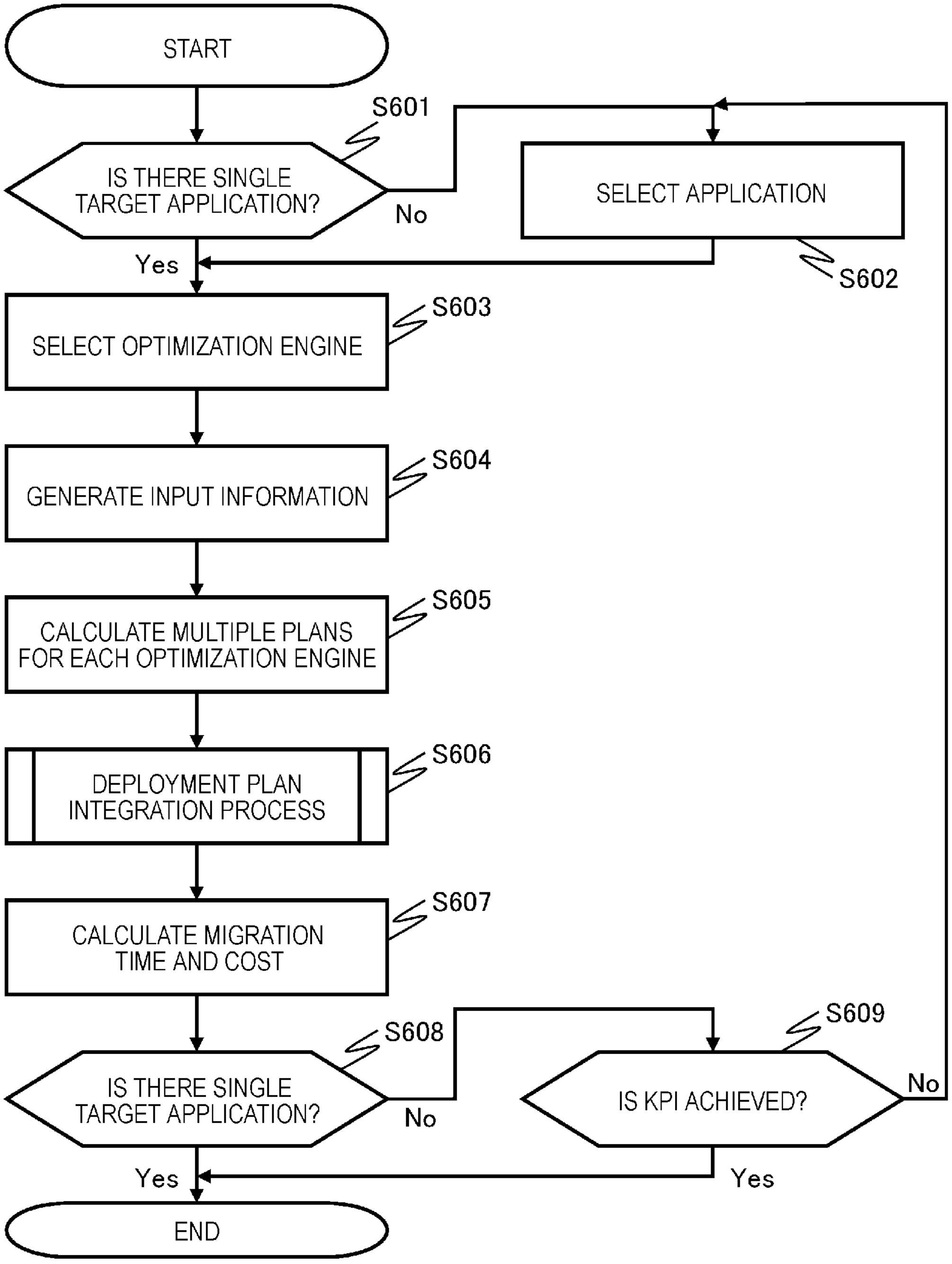
FIG. 14 is a flowchart illustrating an example of a deployment plan creation process.

FIG. 14 is a flowchart illustrating an example of the deployment plan creation process in step S503 of FIG. 12.

In the deployment plan creation process, the deployment optimization program 111 determines whether there is a single application to be calculated for the container and data deployment plan, based on the use case and the application included as the deployment conditions in the calculation request (step S601). When there are a plurality of applications to be calculated (step S601: No), the deployment optimization program 111 selects one of the plurality of applications to be calculated (step S602). For example, the deployment optimization program 111 determines, based on the execution logs of the applications to be calculated, an application having the greatest impact on the KPI among the non-selected applications to be calculated, and selects the application as an application to be deployed (step S602). In addition, when there is a single application to be calculated (step S601: Yes), the process of step S602 is skipped.

Next, the deployment optimization program 111 selects, as target engines, a plurality of optimization engines to be used for calculation of the container and data deployment plan from among the optimization engines 1100 stored in the memory 110, based on a designated use case and a designated policy, which are the use case and the optimization policy included as the deployment conditions in the calculation request, and the optimization engine management table 1200 (step S603). Specifically, the deployment optimization program 111 selects, as the target engines, a plurality of optimization engines that support the designated policy from among the optimization engines that support the designated use case. It is assumed herein that there are a plurality of designated policies. In this case, the deployment optimization program 111 selects, as target engines, the plurality of optimization engines 1100 that support each of the plurality of designated policies. For example, when the designated use case is "Secondary Use" and the designated KPIs are "Application Performance" and "Cost", the deployment optimization program 111 selects, as the target engines, the optimization engine 1100 that supports the KPI of "Application Performance" and the optimization engine 1100 that supports the KPI of "Cost" from among the optimization engines 1100 that support the use case of "Secondary Use".

The deployment optimization program 111 generates input information to be input to each target engine based on the resource management table 700, the metadata search result 650 between distributed sites, the application management table 900, and the data store management table 1000 (step S604). Examples of the input information include a surplus resource amount and a surplus power amount remaining (not used) at each site 200, a resource amount and an amount of power consumption already used for applications and data stores, restriction information on movement of applications and data, and the like, but are not limited to these examples.

The deployment optimization program 111 inputs the input information and the KPI included as the deployment conditions in the calculation request to each of the target engines, causes each of the target engines to calculate candidate information, and selects a plurality of pieces of target candidate information from the candidate information (see FIG. 15) based on predetermined conditions (step S605). Herein, the deployment optimization program 111 calculates the plurality of pieces of candidate information for each target engine, and further selects, as target candidate information, a predetermined number of pieces of candidate information in descending order of evaluation values from the candidate information for each target engine.

Then, the deployment optimization program 111 executes a deployment plan integration process (see FIGS. 16 and 17) of generating the container and data deployment information 3000 for integrated information obtained by integrating the target candidate information of different target engines based on the candidate deployment plans included in the target candidate information (step S606).

The deployment optimization program 111 calculates a load evaluation value obtained by evaluating a load applied when deploying data and containers according to the container and data deployment information 3000, and adds the load evaluation value to the container and data deployment plan based on the container and data deployment information 3000 and the management information (step S607). In the present embodiment, the load evaluation value is a migration time and a migration cost for deploying the data and containers, but is not limited to this example. For example, the load evaluation value may be one of the migration time and the migration cost, or other information such as an amount of power for deploying the data and containers.

The deployment optimization program 111 determines whether there is a single application to be calculated (step S608). When there are a plurality of applications to be calculated (step S608: No), the deployment optimization program 111 determines whether the KPI, that is, the target performance of the candidate deployment plan based on the integrated information, is achieved (step S609). When the KPI is not achieved (step S609: No), the process returns to step S603 to select the next most influential application.

When there is a single application to be calculated (step S608: Yes) and when the KPI is achieved (step S609: Yes), the deployment optimization program 111 ends the process.

FIG. 15 is a diagram an example of the candidate information. Candidate information 2000 shown in FIG. 15 includes a container deployment plan 2010, a container allocation resource plan 2020, a data deployment plan 2030, a data store allocation resource plan 2040, and an execution information estimation 2050.

The container deployment plan 2010 is information indicating the deployment destination for deploying the container, and includes fields 2011 to 2013. The field 2011 stores a container ID, that is, identification information for identifying the container. The field 2012 stores a site ID identifying a deployment site (deployment site system), that is, the site 200 where the container is deployed. The field 2013 stores an infrastructure ID identifying a deployment infrastructure, that is, an infrastructure for deploying the container.

The container allocation resource plan 2020 is information indicating an amount of allocation resource to be allocated to the container, and includes fields 2021 and 2022 in the illustrated example. The field 2021 stores the number of CPU cores to be allocated to the container. The field 2022 stores a memory capacity to be allocated to the container. The container allocation resource plan 2020 may include fields that store amounts of allocation resources for other hardware resources.

The data deployment plan 2030 is information indicating the deployment destination for deploying the data, and includes fields 2031 to 2034. The field 2031 stores a data ID identifying the data. The field 2032 stores a site ID identifying a deployment site, that is, the site 200 that stores the data. In the present embodiment, the container deployment site and the data deployment site are the same as each other. The field 2033 stores an infrastructure ID identifying a deployment infrastructure, that is, an infrastructure for storing the data. The field 2034 stores a data store ID identifying a deployment data store, that is, a data store for reading and writing the data. It is to be noted that the data deployment plan 2030 may further include a field and the like for storing an infrastructure ID identifying an infrastructure that executes the data store.

The data store allocation resource plan 2040 is information indicating an amount of allocation resource to be allocated to the data store, and includes fields 2041 and 2042 in the illustrated example. The field 2041 stores the number of CPU cores to be allocated to the data store. The field 2042 stores a memory capacity to be allocated to the data store. The data store allocation resource plan 2040 may include fields that store amounts of allocation resources for other hardware resources.

The execution information estimation 2050 is information indicating an evaluation value obtained by evaluating the performance related to the processes of the application 151 and the data store 152 according to the candidate deployment plan, and is used to assist the user in determining the validity of the container and data deployment plan.

In the example of FIG. 15, the execution information estimation 2050 includes fields 2051 to 2058 that store evaluation values of different types. Specifically, the field 2051 stores an execution time of the process of the application 151. The field 2052 stores an execution cost of the application 251. The field 2053 stores an availability of the application 251 at the time of execution. The field 2054 stores a renewable energy rate, that is, a ratio of an amount of power by the renewable energy with respect to an amount of power consumption by the execution of the application 251. The field 2055 stores the amount of power consumption by the execution of the application 251. The field 2056 stores an amount of $CO_2$ emissions by the execution of the application 251. In addition, the amount of $CO_2$ emissions can be calculated from the amount of power and the like by the energies other than the renewable energy with respect to the amount of power consumption by the execution of the application 251. The field 2057 stores a data transfer time required to transition to deployment. The field 2058 stores a data transfer cost required to transition to deployment.

The evaluation value stored in the execution information estimation 2050 is changed for each optimization policy supported by the optimization engine 1100 as described above. In the example of FIG. 15, the execution information estimation 2050 stores only the execution time as the evaluation value.

Figure 16:
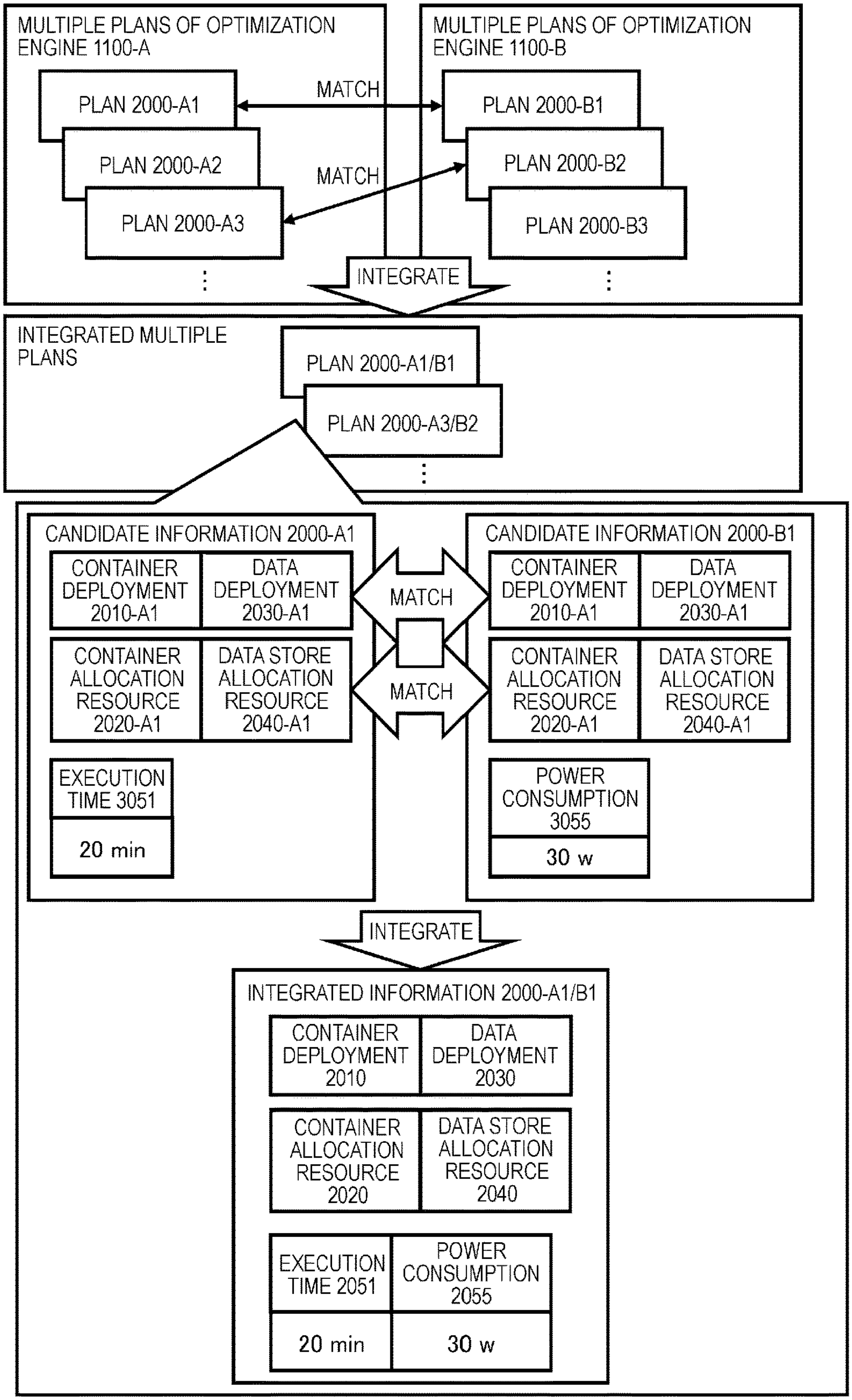
FIG. 16 is a diagram showing an example of a deployment plan integration process.
Figure 17:
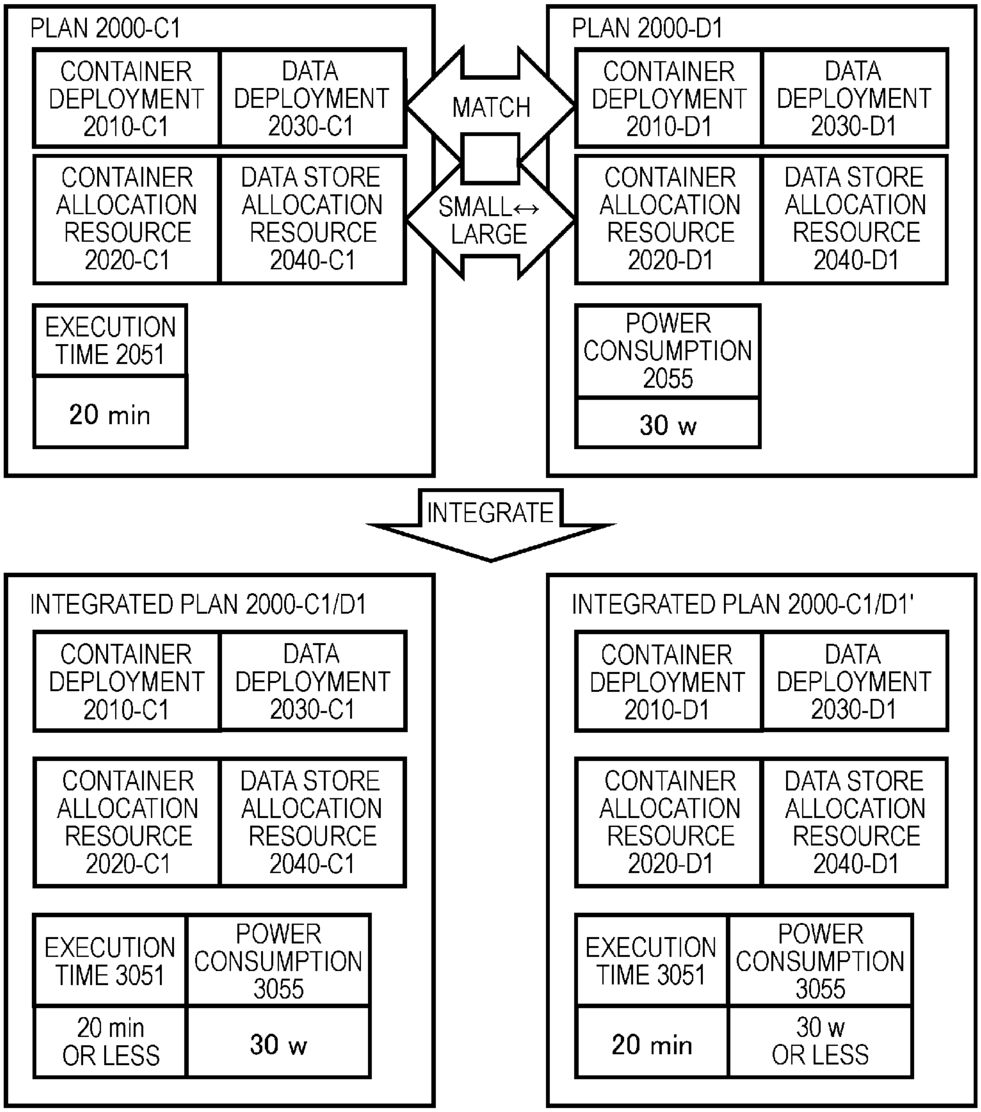
FIG. 17 is a diagram showing another example of the deployment plan integration process.

FIGS. 16 and 17 are diagrams showing an example of the deployment plan integration process in step S606 of FIG. 14. The deployment plan integration process is a process in which the deployment optimization program 111 integrates a plurality of pieces of candidate information having at least partially matching (common) candidate deployment plans. The example of FIG. 16 is an example of integrating candidate information having all of the candidate deployment plans matching each other, and the example of FIG. 17 is an example of integrating candidate information having some of the candidate deployment plans matching each other. The candidate information (e.g., plan 2000-A2, and the like) with no matching candidate deployment plan may be discarded.

FIG. 16 shows an example of integrating a plurality of pieces of candidate information (plans 2000-A1, A2, and so on) calculated by an optimization engine 1100-A and a plurality of pieces of candidate information (plans 2000-B1, B2, and so on) calculated by an optimization engine 1100-B. The optimization engine 1100-A is an optimization engine that supports “Application Performance” as the performance index for the optimization policy, and the optimization engine 1100-B is an optimization engine that supports “Power Consumption” as the performance index for the optimization policy. Further, the candidate information calculated by the optimization engine 1100-A includes an execution time 3051 as the evaluation value, and the candidate information calculated by the optimization engine 1100-B includes an amount of power consumption 3055.

In the example of FIG. 16, in the candidate information of the optimization engines 1100-A and 1100-B, there is candidate information (plans 2000-A1 and B1 and plans 2000-

A3 and B2) having all of the container deployment plan 2010, the container allocation resource plan 2020, the data deployment plan 2030, and the data store allocation resource plan 2040 matching each other. In this case, the deployment optimization program 111 generates integrated information (plans 2000-A1/B1 and A3/B2) by integrating all the matching candidate information. At this time, the deployment optimization program 111 adds, to the integrated information, all the evaluation values included in each piece of candidate information before integration. Thus, for example, the integrated information (plan 2000-A1/B1) includes both the execution time 3051 and the amount of power consumption 3055.

FIG. 17 shows an example of integrating candidate information (plan 2000-C1) calculated by an optimization engine 1100-C and candidate information (plan 2000-D1) calculated by an optimization engine 1100-D. The optimization engine 1100-C is an optimization engine that supports "Application Performance" as the performance index for the optimization policy, and the optimization engine 1100-D is an optimization engine that supports "Power Consumption" as the performance index for the optimization policy. Further, the candidate information calculated by the optimization engine 1100-C includes an execution time 3051 as the evaluation value, and the candidate information calculated by the optimization engine 1100-D includes an amount of power consumption 3055.

In the example of FIG. 17, in the candidate information for each of the optimization engines 1100-C1 and 1100-D1, the container deployment plan 2010 and the data deployment plan 2030 match each other, and the container allocation resource plan 2020 and the data store allocation resource plan 2040 are different from each other. Even in this case, the deployment optimization program 111 generates the integrated information by integrating these pieces of candidate information.

At this time, the deployment optimization program 111 adds a corrected evaluation value, which is obtained by correcting the evaluation value included in the candidate information based on the allocation resource amount included in each piece of candidate information, to the integrated information. For example, for all HW resource types included in the container allocation resource plan 2020 and the data store allocation resource plan 2040, the deployment optimization program 111 searches a pair of candidate information in which one plan has a greater allocation resource amount than the other plan. Then, the deployment optimization program 111 incorporates the execution time 3051 of the plan with a smaller allocation resource amount to the plan with a larger allocation resource amount, and incorporates the amount of power consumption 3055 of the plan with a larger allocation resource amount to the plan with a smaller allocation resource amount. At this time, the deployment optimization program 111 corrects the amount of power consumption 3055 of the plan to which the execution time 3051 is incorporated to the maximum value of the power consumption, and corrects the execution time 3051 of the plan to which the amount of power consumption 3055 is incorporated to the maximum value of the execution time. This is based on the fact that the performance increases as an amount of HW resources increases, or the power consumption increases as the amount of HW resources used increases.

Figure 18:
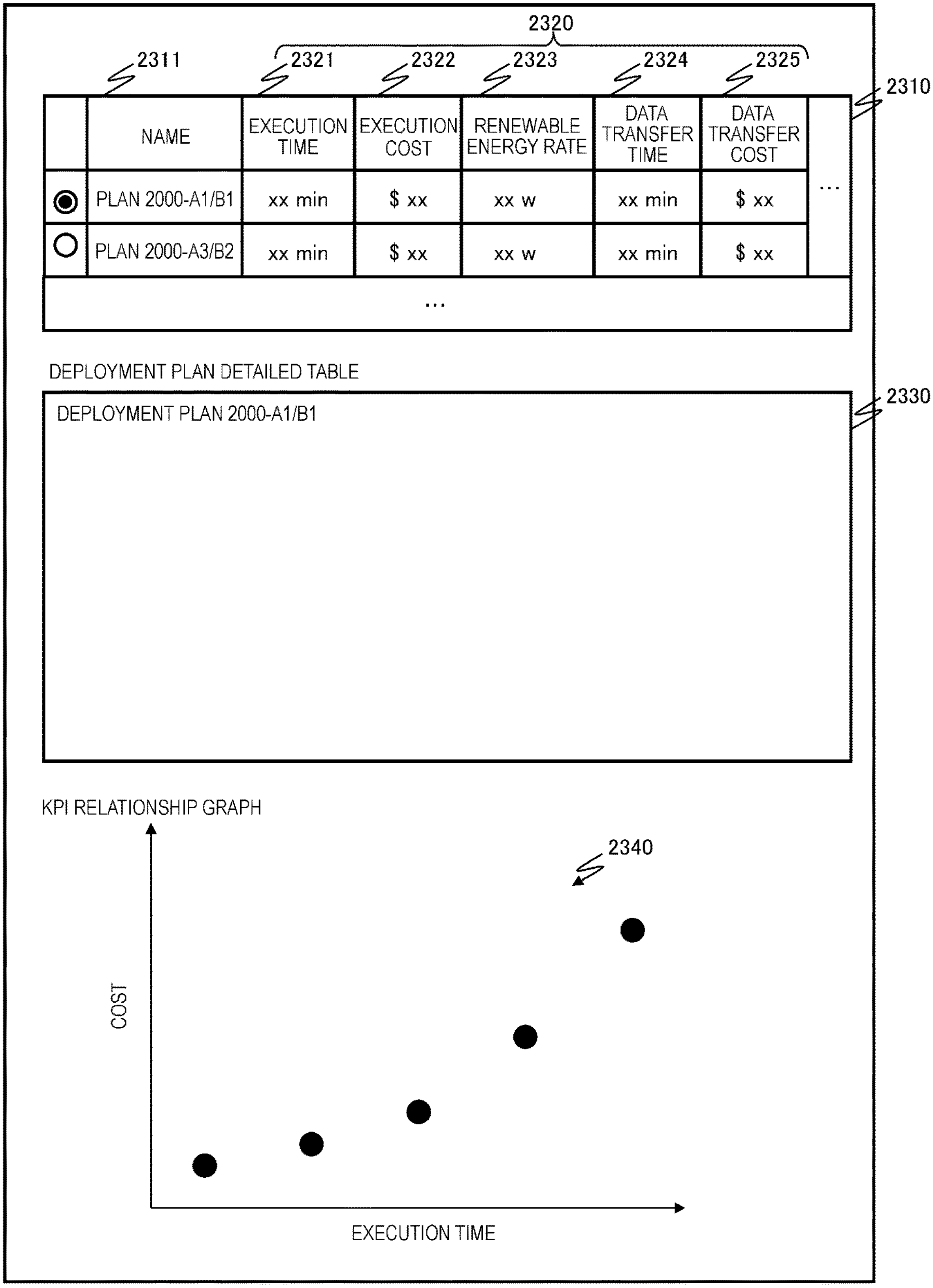
FIG. 18 is a diagram showing an example of a presentation screen.

FIG. 18 is a diagram showing an example of a presentation screen for presenting the container and data deployment information 3000, that is, the integrated information to the user. A presentation screen 2300 shown in FIG. 18 includes a deployment plan comparison table 2310, a deployment plan detailed table 2330, and a KPI relationship graph 2340.

The deployment plan comparison table 2310 shows a list of the container and data deployment information 3000, and includes fields 2311 and 2320. The field 2311 stores a name for identifying the container and data deployment information 3000. The field 2320 is information for assisting the user in determining the validity of the container and data deployment information 3000, and stores estimation information according to the execution information estimation 2050 included in the container and data deployment information 3000. The estimation information may be the execution information estimation 2050 itself, or may be information obtained by processing the execution information estimation 2050 in consideration of visibility by the user, and the like. Processing the execution information estimation 2050 may include a temporary deletion of items, a calculation of cost statistics (e.g., totals, and the like) such as execution cost 3052 and data transfer cost 3058, and the like. In the example of FIG. 18, the field 2320 includes fields 2321 to 2325 storing an execution time, an execution cost, a renewable energy rate, a data transfer time, and a data transfer cost, respectively.

The deployment plan detailed table 2330 shows the deployment plan information indicating the container and data deployment information 3000 as details of the deployment plan selected in the deployment plan comparison table 2310. The deployment plan detailed table 2330 may be the container and data deployment information 3000 itself, or may be information obtained by processing the container and data deployment information 3000 in consideration of visibility by the user, and the like.

The KPI relationship graph 2340 visualizes the relationship between KPIs by taking the KPIs designated by the user on the vertical and horizontal axes and plotting the evaluation values of each deployment plan. It is to be noted that there may be one, or three or more KPIs designated by the user.

Figure 19:
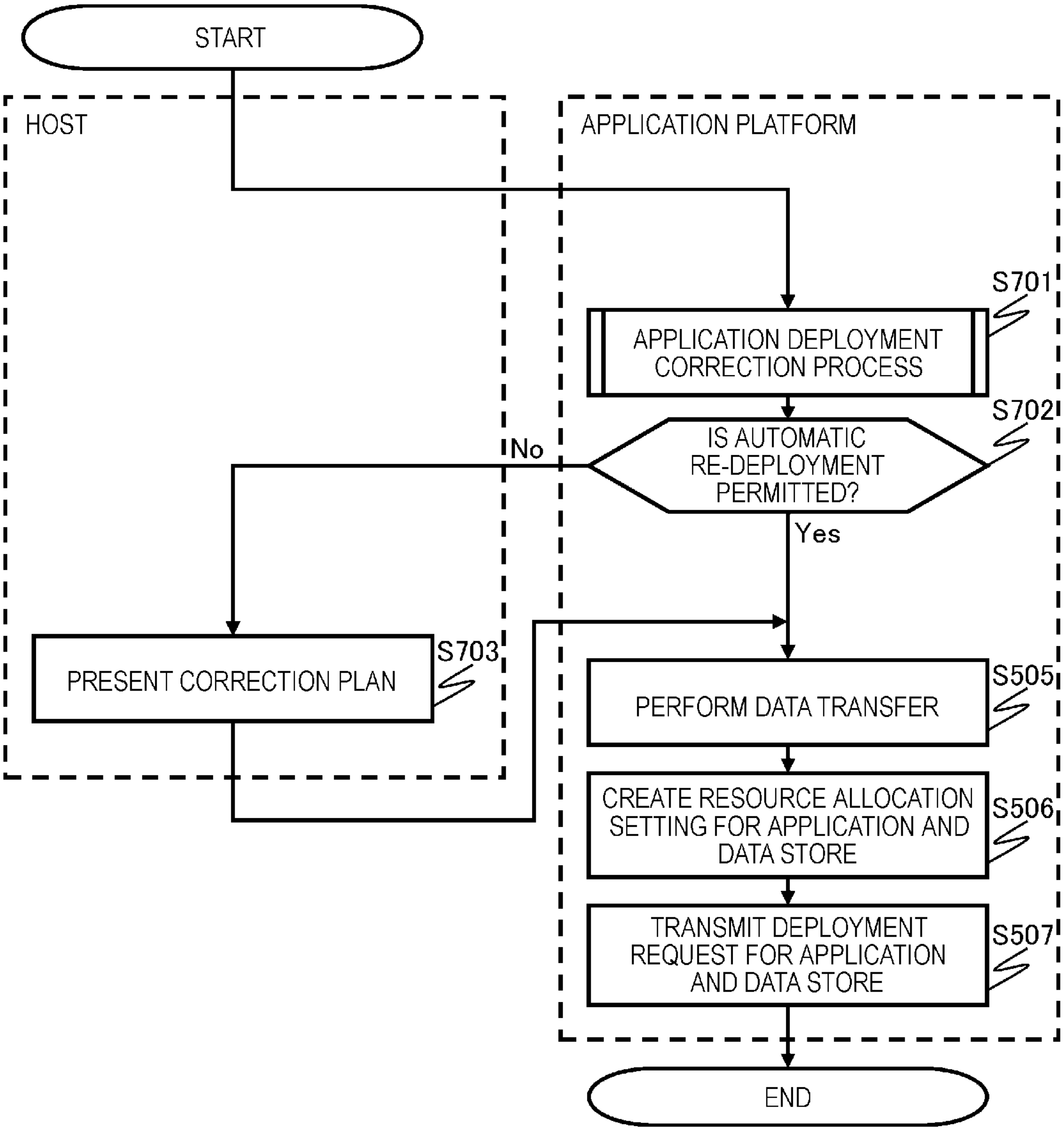
FIG. 19 is a flowchart illustrating an example of an application deployment correction process.

FIG. 19 is a flowchart illustrating an example of an application deployment correction process of correcting the deployed application 151 and the data store 152.

The application deployment correction process is executed when predetermined conditions are met (for example, when detecting that the KPI is not achieved based on the performance information, cost information, and power information of the application and data store collected from each site, when detecting that the performance of the application is degraded or stopped due to the occurrence of a failure, and when it is set to calculate a correction plan for the application deployment on a regular basis, and the like).

In the application deployment correction process, first, the deployment optimization program 111 generates, as a correction plan, container and data deployment information for the application to be corrected based on the KPI set at the time of deployment (step S701). At this time, for example, the deployment optimization program 111 may change the surplus amount of HW resources at each site 200, or change the formulas, parameters, or the like used by the optimization engine 1100, by comparing to when the container and data deployment information 3000 is first created.

The deployment optimization program confirms whether the automatic correction of container and data deployment is permitted (step S702). It is to be noted that permission or prohibition of the automatic correction is set in advance by the user or the like, for example.

When the automatic correction is not permitted (step S702: No), the deployment optimization program 111 transmits the generated correction plan to the host 150 and inquires of the user whether to permit deployment based on the correction plan (step S703). It is assumed herein that the deployment is permitted. In this case, the client program 162 of the host 150 transmits a deployment request to the application platform 100 based on the correction plan. In addition, when the automatic correction is permitted (step S702: Yes), the deployment optimization program 111 skips the process of step S703.

Then, the processes of steps S505 to S507 of the application deployment process described with reference to FIG. 12 are executed.

As described above, according to the present embodiment, the deployment optimization program 111 causes each of the plurality of optimization engines 1100 that use different policies for calculating the deployment plans for data and containers to calculate the candidate information including the candidate deployment plan that is the candidate for the deployment plan, and the evaluation value obtained by evaluating the process related to the data in the candidate deployment plan, and integrates a plurality of pieces of the candidate information based on the candidate deployment plan included in the calculated plurality of pieces of the candidate information so as to generate the data and container deployment plan information. Therefore, it is possible to generate the data and container deployment information in consideration of various requests of users by using the plurality of optimization engines 1100, thereby easily creating the deployment plans in consideration of various requests of the users.

In addition, in the present embodiment, the deployment optimization program 111 executes, as the target engine, the optimization engine 1100 supporting each of the designated plurality of optimization policies. Therefore, it is possible to more appropriately consider various requests of the users.

In addition, in the present embodiment, the deployment optimization program 111 executes, as the target engine, the optimization engine 1100 supporting both the designated optimization policy and the use case. Therefore, it is possible to more appropriately consider various requests of the users.

Further, in the present embodiment, the deployment optimization program 111 integrates a plurality of pieces of candidate information in which at least some of the candidate deployment plans are common to each other. More specifically, a plurality of pieces of candidate information having deployment sites in common are integrated. In this case, the candidate information can be appropriately integrated.

In addition, in the present embodiment, the deployment optimization program 111 generates the data and container deployment information including the evaluation value included in each piece of candidate information when there is a plurality of pieces of candidate information having both the deployment site and the allocation resource amount in common. In addition, when there are a plurality of pieces of candidate information having the deployment site in common and different allocation resource amounts, the deployment optimization program 111 generates integrated information including corrected evaluation values obtained by correcting a plurality of evaluation values included in each piece of candidate information based on the allocation resource amount included in each piece of candidate information. Therefore, it is possible to present the evaluation value obtained by properly evaluating the data and container deployment plan.

In addition, in the present embodiment, the deployment optimization program 111 adds, to the data and container deployment plan information, a load evaluation value obtained by evaluating the load applied when deploying data and containers according to the data and container deployment plan information based on the data and container deployment plan information and the management information. For example, the load evaluation value includes at least one of the migration time and the migration cost for deploying the data and containers. In this case, it is possible to allow the user to more appropriately determine whether the data and container deployment plan is valid.

The deployment optimization program 111 deploys the data and containers according to the data and container deployment plan, corrects the data and container deployment plan when predetermined conditions are met, and re-deploys the data and containers according to the corrected data and container deployment plan. In this case, proper deployment is possible.

The embodiments of the present disclosure described above are illustrative examples of the present disclosure, and are not intended to limit the scope of the present disclosure only to those embodiments. Those skilled in the art can implement the present disclosure in various other forms without departing from the scope of the present disclosure.

What is claimed is:

1. A deployment plan calculation device that generates deployment plan information on a deployment plan for deploying data and a processing component for performing a process related to the data to one of a plurality of site systems having computers, wherein
- in the deployment plan, the data and the processing component, and the plurality of site systems where the data and the processing component are deployed are associated with each other, and
- the deployment plan calculation device comprises:
- a memory;
- a processor; and
- a plurality of calculation engines executed by the processor, wherein
  - the memory stores management information on each of the plurality of site systems,
  - the plurality of calculation engines calculate candidate information including a candidate deployment plan that is a candidate for the deployment plan, and an evaluation value obtained by evaluating a process related to data in the candidate deployment plan based on the management information and a target performance that is a target performance of the process,
  - each of the plurality of calculation engines has a plurality of policies defining calculation methods for calculating the candidate information, and calculates the candidate information using one or more of the plurality of policies, respectively, and
  - the processor causes each of the plurality of calculation engines that use different policies for calculating the deployment plan to calculate the candidate information, and integrates a plurality of pieces of the candidate information based on the candidate deployment plan included in the calculated plurality of pieces of the candidate information so as to generate the deployment plan information,
- wherein the processor integrates the plurality of pieces of the candidate information having at least part of a combination of the data and the processing component of the candidate deployment plan and the site system where the data and the processing component are deployed common to each other.

2. The deployment plan calculation device according to claim 1, wherein the processor executes the calculation engine corresponding to each of a plurality of policies designated by designation information designating the plurality of policies.

3. The deployment plan calculation device according to claim 2, wherein the each of the plurality of calculation engines corresponds to one of a plurality of use cases that are purposes of using the site systems, the designation information further designates the use case to be used in calculating the deployment plan, and the processor executes the calculation engine corresponding to both the policy and the use case designated by the designation information.

4. The deployment plan calculation device according to claim 1, wherein the deployment plan includes a deployment site system that is a site system from the plurality of site systems where the data and the processing component are deployed, and an allocation resource amount that is an amount of hardware resources to be allocated to the processing component in the deployment site system.

5. The deployment plan calculation device according to claim 4, wherein the deployment plan information includes an evaluation value obtained by evaluating the process related to the data in the deployment plan, and when there are the plurality of pieces of the candidate information in which both the deployment site system and the allocation resource amount are the same as each other, the processor corrects a plurality of the evaluation values included in each of the plurality of pieces of the candidate information so as to generate the evaluation value of the deployment plan information.

6. The deployment plan calculation device according to claim 4, wherein the deployment plan information includes an evaluation value obtained by evaluating the process related to the data in the deployment plan, and when there are a plurality of the pieces of the candidate information having the deployment site system in common and the allocation resource amounts differently, the processor corrects a plurality of the evaluation values included in each of the plurality of pieces of candidate information based on the allocation resource amount included in each of the plurality of pieces of the candidate information so as to generate the evaluation value of the deployment plan information.

7. The deployment plan calculation device according to claim 1, wherein the processor adds, to the deployment plan information, a load evaluation value obtained by evaluating a load applied when deploying the data and the processing component according to the deployment plan information, based on the deployment plan information and the management information, and the load evaluation value includes at least one of a migration time and a migration cost for deploying the data and the processing component according to the deployment plan information.

8. The deployment plan calculation device according to claim 1, wherein the processor deploys the data and the processing component according to the deployment plan information.

9. The deployment plan calculation device according to claim 8, wherein the processor deploys the data and the processing component according to the deployment plan information, corrects the deployment plan information when a predetermined condition is met, and re-deploys the data and the processing component according to the corrected deployment plan information.

10. A deployment plan calculation method using a deployment plan calculation device that generates deployment plan information on a deployment plan for deploying data and a processing component for performing a process related to the data to one of a plurality of site systems having computers, wherein in the deployment plan, the data and the processing component, and the plurality of site systems where the data and the processing component are deployed are associated with each other, and the deployment plan calculation device includes a memory, a processor, and a plurality of calculation engines executed by the processor, wherein the memory stores management information on each of the plurality of site systems, the plurality of calculation engines calculate candidate information including a candidate deployment plan that is a candidate for the deployment plan, and an evaluation value obtained by evaluating a process related to data in the candidate deployment plan based on the management information and a target performance that is a target performance of the process, each of the plurality of calculation engines has a plurality of policies defining calculation methods for calculating the candidate information, and calculates the candidate information using one or more of the plurality of policies, respectively, and the processor causes each of the plurality of calculation engines that use different policies for calculating the deployment plan to calculate the candidate information, and integrates a plurality of pieces of the candidate information based on the candidate deployment plan included in the calculated plurality of pieces of the candidate information so as to generate the deployment plan information, wherein the processor adds, to the deployment plan information, a load evaluation value obtained by evaluating a load applied when deploying the data and the processing component according to the deployment plan information, based on the deployment plan information and the management information.

11. A computer system comprising:

a plurality of site systems having computers; and a deployment plan calculation device that generates deployment plan information on a deployment plan for deploying data and a processing component for performing a process related to the data to one of the plurality of site systems, wherein in the deployment plan, the data and the processing component, and the plurality of site systems where the data and the processing component are deployed are associated with each other, and the deployment plan calculation device comprises:

a memory;

a processor; and a plurality of calculation engines executed by the processor, wherein the memory stores management information on each of the plurality of site systems, the plurality of calculation engines calculate candidate information including a candidate deployment plan that is a candidate for the deployment plan, and an evaluation value obtained by evaluating a process related to data in the candidate deployment plan based on the management information and a target performance that is a target performance of the process, each of the plurality of calculation engines has a plurality of policies defining calculation methods for calculating the candidate information, and calculates the candidate information using one or more of the plurality of policies, respectively, the processor causes each of the plurality of calculation engines that use different policies for calculating the deployment plan to calculate the candidate information, and integrates a plurality of pieces of the candidate information based on the candidate deployment plan included in the calculated plurality of pieces of the candidate information so as to generate the deployment plan information, the processor executes the calculation engine corresponding to each of a plurality of policies designated by designation information designating the plurality of policies, the each of the plurality of calculation engines corresponds to one of a plurality of use cases that are purposes of using the site systems, the designation information further designates the use case to be used in calculating the deployment plan, and the processor executes the calculation engine corresponding to both the policy and the use case designated by the designation information.

12. The computer system according to claim 11, wherein the processor integrates the plurality of pieces of the candidate information having at least part of a combination of the data and the processing component of the candidate deployment plan and the site system where the data and the processing component are deployed common to each other.

13. The computer system according to claim 12, wherein the deployment plan includes a deployment site system that is a site system from the plurality of site systems where the data and the processing component are deployed, and an allocation resource amount that is an amount of hardware resources to be allocated to the processing component in the deployment site system.

14. The computer system according to claim 13, wherein the deployment plan information includes an evaluation value obtained by evaluating the process related to the data in the deployment plan, and when there are the plurality of pieces of the candidate information in which both the deployment site system and the allocation resource amount are the same as each other, the processor corrects a plurality of the evaluation values included in each of the plurality of pieces of the candidate information so as to generate the evaluation value of the deployment plan information.

15. The computer system according to claim 13, wherein the deployment plan information includes an evaluation value obtained by evaluating the process related to the data in the deployment plan, and when there are a plurality of the pieces of the candidate information having the deployment site system in common and the allocation resource amounts differently, the processor corrects a plurality of the evaluation values included in each of the plurality of pieces of candidate information based on the allocation resource amount included in each of the plurality of pieces of the candidate information so as to generate the evaluation value of the deployment plan information.

16. The computer system according to claim 11, wherein the processor adds, to the deployment plan information, a load evaluation value obtained by evaluating a load applied when deploying the data and the processing component according to the deployment plan information, based on the deployment plan information and the management information.

17. The computer system according to claim 16, wherein the load evaluation value includes at least one of a migration time and a migration cost for deploying the data and the processing component according to the deployment plan information.

18. The computer system according to claim 11, wherein the processor deploys the data and the processing component according to the deployment plan information.

19. The computer system according to claim 18, wherein the processor deploys the data and the processing component according to the deployment plan information, corrects the deployment plan information when a predetermined condition is met, and re-deploys the data and the processing component according to the corrected deployment plan information.

* * * * *